United States Patent
Hotta et al.

(10) Patent No.: US 8,114,553 B2
(45) Date of Patent: Feb. 14, 2012

(54) FUEL CELL

(75) Inventors: Yutaka Hotta, Susono (JP); Kimihide Horio, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 331 days.

(21) Appl. No.: 12/312,775

(22) PCT Filed: Dec. 25, 2007

(86) PCT No.: PCT/JP2007/075357
§ 371 (c)(1),
(2), (4) Date: May 27, 2009

(87) PCT Pub. No.: WO2008/081962
PCT Pub. Date: Jul. 10, 2008

(65) Prior Publication Data
US 2010/0040925 A1    Feb. 18, 2010

(30) Foreign Application Priority Data
Dec. 27, 2006    (JP) .................................. 2006-350905

(51) Int. Cl.
H01M 2/02    (2006.01)
(52) U.S. Cl. ........................ 429/507; 429/508; 429/511

(58) Field of Classification Search .................. 429/507, 429/511, 508
See application file for complete search history.

(56) References Cited

U.S. PATENT DOCUMENTS
2002/0058177 A1    5/2002    Nishiyama et al.
2005/0277012 A1    12/2005    Inagaki FOREIGN PATENT DOCUMENTS
| JP | U-05-030586 | 4/1993 |
| JP | A-06-188008 | 7/1994 |
| JP | A-2002-124292 | 4/2002 |
| JP | A-2003-203670 | 7/2003 |
| JP | A-2003-297377 | 10/2003 |
| JP | A-2004-288618 | 10/2004 |
| JP | A-2005-317359 | 11/2005 |

*Primary Examiner* — Jane Rhee
(74) *Attorney, Agent, or Firm* — Oliff & Berridge, PLC

(57) ABSTRACT

A fuel cell, which employs power generation units that have an electrolyte membrane and electrodes respectively disposed to either side of the electrolyte membrane, comprises a stack that includes a stacked plurality of the power generation units, a clamping member, and a shear elastic member. The clamping member is used for clamping the stack in the stacking direction. The shear elastic member is interposed between the clamping member and an end face of the stack in the stacking direction, and elastically deform in a shearing direction which lies orthogonal to the stacking direction.

10 Claims, 12 Drawing Sheets

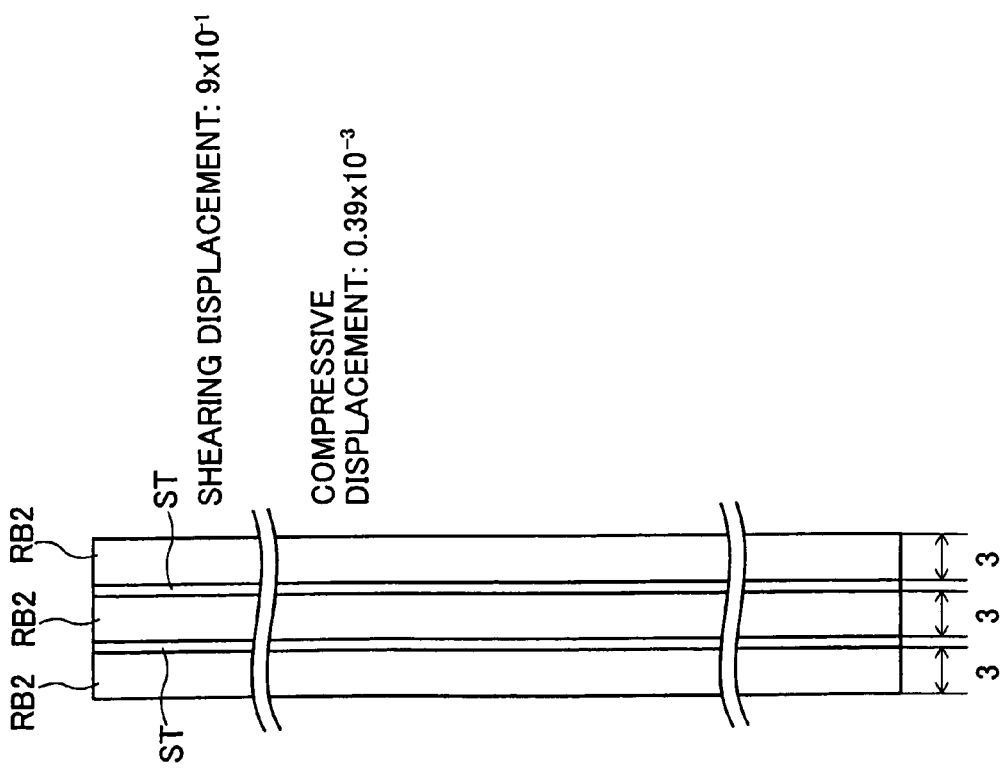
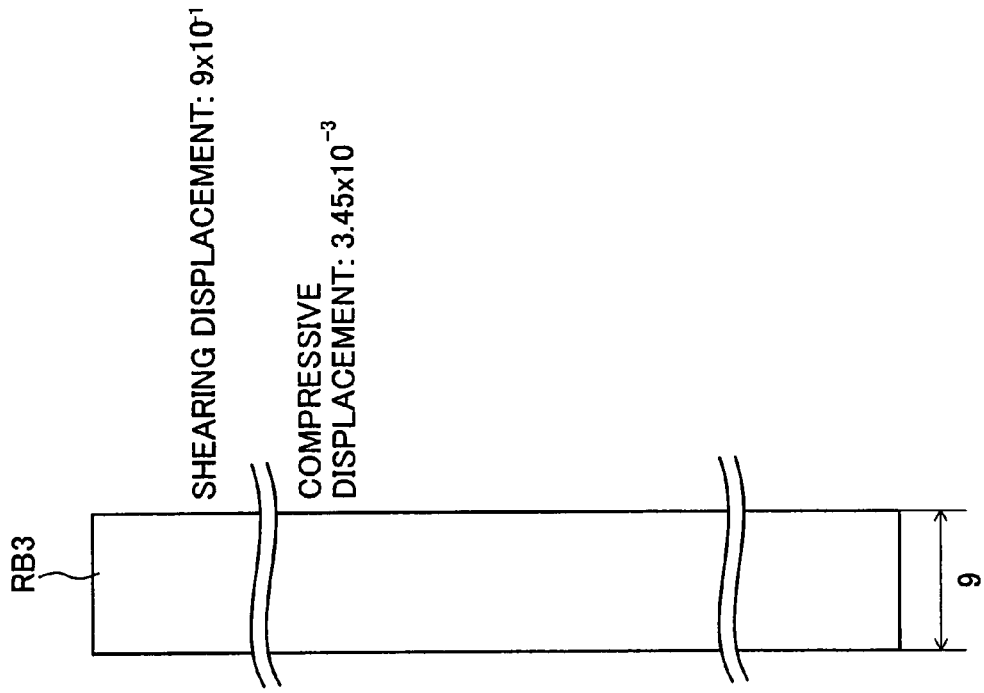

FUEL CELL

TECHNICAL FIELD

The present invention relates in general to a fuel cell, and relates in particular to an improvement to a fuel cell stack.

BACKGROUND ART

A fuel cell, for example a solid polymer fuel cell, converts chemical energy of matter directly into electrical energy by supplying reactant gases (namely, a fuel gas containing hydrogen and an oxidant gas containing oxygen) respectively to two electrodes (a fuel electrode and an oxygen electrode) that are arranged in opposition to either side of an electrolyte membrane, to bring about an electrochemical reaction. One predominant known structure for such fuel cells is a stacked structure composed of a stack of power generation units that include an electrolyte membrane of generally planar shape and that are fastened in the stacking direction.

In some instances, service conditions under which a fuel cell will be used require that it have sufficient durability to withstand external shock and vibration. There are known technologies directed to improving shock resistance and vibration resistance of fuel cells by providing plates disposed covering the side faces of the fuel cell stack in the stacking direction, and arranging cushion members between the plates and the stack.

However, ever higher requirements for fuel cells with respect to shock resistance and vibration resistance make further improvements in shock resistance and vibration resistance of fuel cells desirable.

DISCLOSURE OF THE INVENTION

With the foregoing in view, it is accordingly one object of the present invention to improve shock resistance and vibration resistance of a fuel cell.

In order to attain the above object, a first aspect of the present invention provides a fuel cell employing power generation units that have an electrolyte membrane and electrodes respectively disposed to either side of the electrolyte membrane. The fuel cell according to the first aspect comprises a stack that includes a stacked plurality of the power generation units, a clamping member, and a shear elastic member. The clamping member is used for clamping the stack in the stacking direction. The shear elastic member elastically deform in a shearing direction which lies orthogonal to the stacking direction.

This will improve shock resistance and vibration resistance of the fuel cell through the vibration isolation effect of the shear elastic member which is adapted to elastically deform in the shearing direction.

In one possible arrangement of the fuel cell according to the first aspect, the shear elastic member includes a rubber elastic member having rubber elasticity. This will improve shock resistance and vibration resistance of the fuel cell through the vibration isolation effect of the rubber elastic member.

In another possible arrangement of the fuel cell according to the first aspect, the amount of elastic deformation of the shear elastic member in the shearing direction is greater than the amount of elastic deformation of the stack in the shearing direction. This will reduce shearing force bearing on the stack, and improve shock resistance and vibration resistance of the fuel cell.

In yet another possible arrangement of the fuel cell according to the first aspect, in the shear elastic member, at least the peripheral edge part of the contact face that contacts another member in the stacking direction is bonded to the another member. This will reduce permanent set in fatigue of the elastic member, and as a result leakage of the reactant gases or cooling medium can be limited.

In yet another possible arrangement of the fuel cell according to the first aspect, in the shear elastic member, at least the peripheral edge part of the contact face that contacts another member in the stacking direction is bonded to the another member. The shear elastic member may include a plurality of rubber elastic members having rubber elasticity, and one or a plurality of low-deforming members whose compressive deformation in the stacking direction is less than that of the plurality of rubber elastic members; and the plurality of rubber elastic members may be stacked with interposition of the low-deformation members. This will ensure a satisfactory amount of elastic deforming in the shearing direction, while at the same time limiting the amount of elastic deformation of the shear elastic member in the compression direction. As a result, shock resistance and vibration resistance of the fuel cell will be improved in both the shearing direction and the stacking direction.

In yet another possible arrangement of the fuel cell according to the first aspect, at least one end of the shear elastic member in the stacking direction is constituted by the low-deforming member, which is disposed in contact against the clamping member or the stack; or the at least one end is constituted by a rubber elastic member, which is disposed in contact against the clamping member or the stack.

In yet another possible arrangement, the fuel cell according to the first aspect further includes a reaction force-imparting member that imparts reaction force to at least a portion of a side face of the stack which extends along the stacking direction, responsive to displacement of the stack in the shearing direction. This will reduce shearing force bearing on the stack, by imparting reaction force to the stack when the stack has experienced displacement in the shearing direction. As a result, shock resistance and vibration resistance of the fuel cell will be improved.

In yet another possible arrangement, the fuel cell according to the first aspect further includes a plate disposed covering at least a portion of the side face of the stack which extends along the stacking direction; and the reaction force-imparting member is a cushion member positioned between the stack and the plate and having cushioning properties. This will reduce shearing force bearing on the stack, through reaction force applied to the stack from the cushion member.

In yet another possible arrangement of the fuel cell according to the first aspect, the stack further includes a collector plate arranged between the clamping member and the plurality of the power generation units; or includes an insulating plate arranged between the collector plate and the clamping member.

The present invention may be reduced to practice in various other modes as well, including device inventions such as a vehicle or mobile object on which the fuel cell according to the preceding mode has been installed; or method inventions such as a placement method for a fuel cell.

The above and any other objects, features, and advantages of the present invention will become more evident upon reading the following detailed description of the preferred embodiments of the invention, made with reference to the accompanying drawings.

BRIEF DESCRIPTION OF THE DRAWINGS

FIGS. 6A and 6B show a stacked structure and EPDM of single-layer structure;

BEST MODE FOR CARRYING OUT THE INVENTION

The fuel will be described below in terms of certain preferred embodiments while making reference to the accompanying drawings.

A. Embodiments

Arrangement of Fuel Cell

Figure 1:
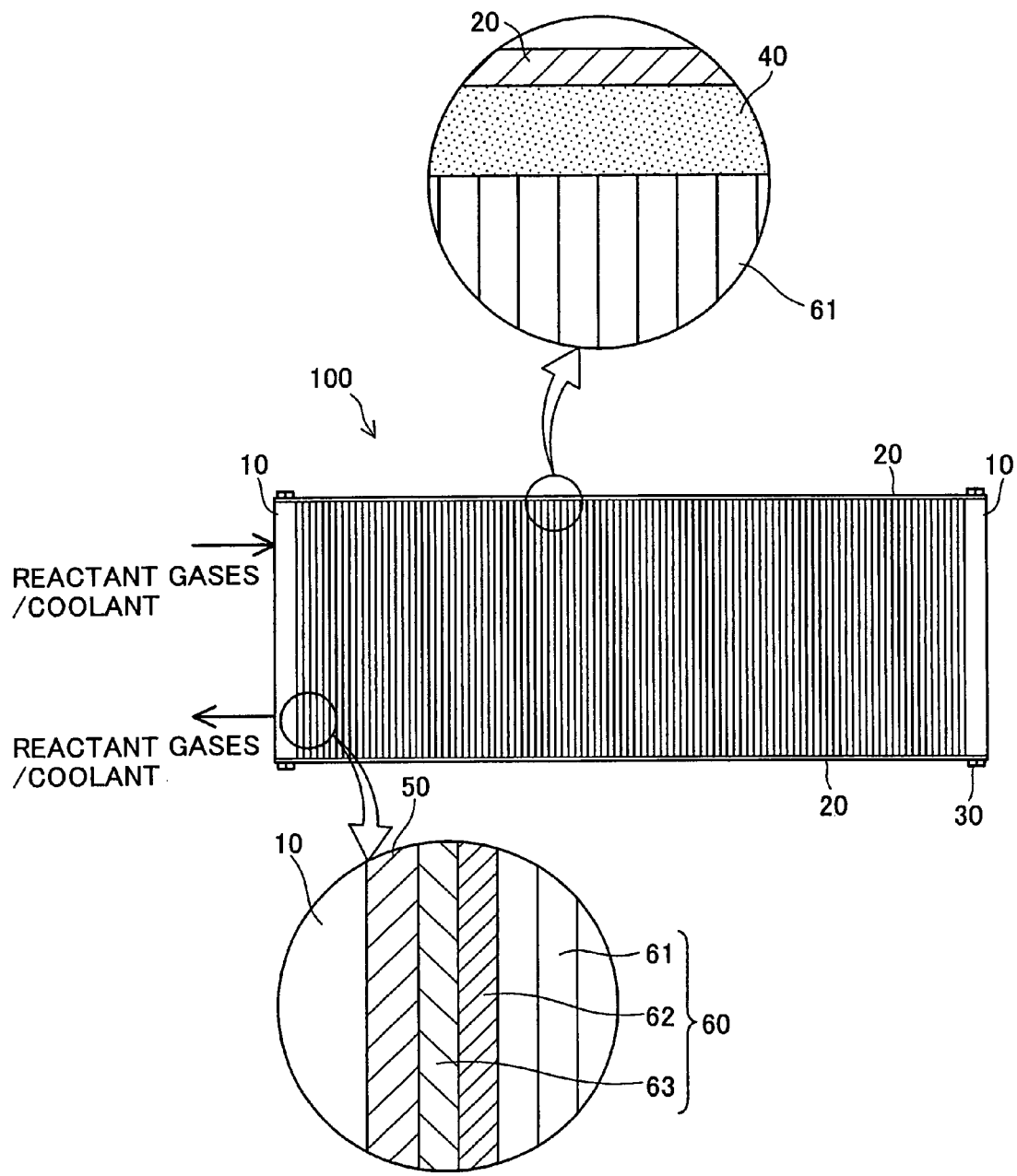
FIG. 1 is an illustration depicting a design of a fuel cell in an embodiment.
Figure 2:
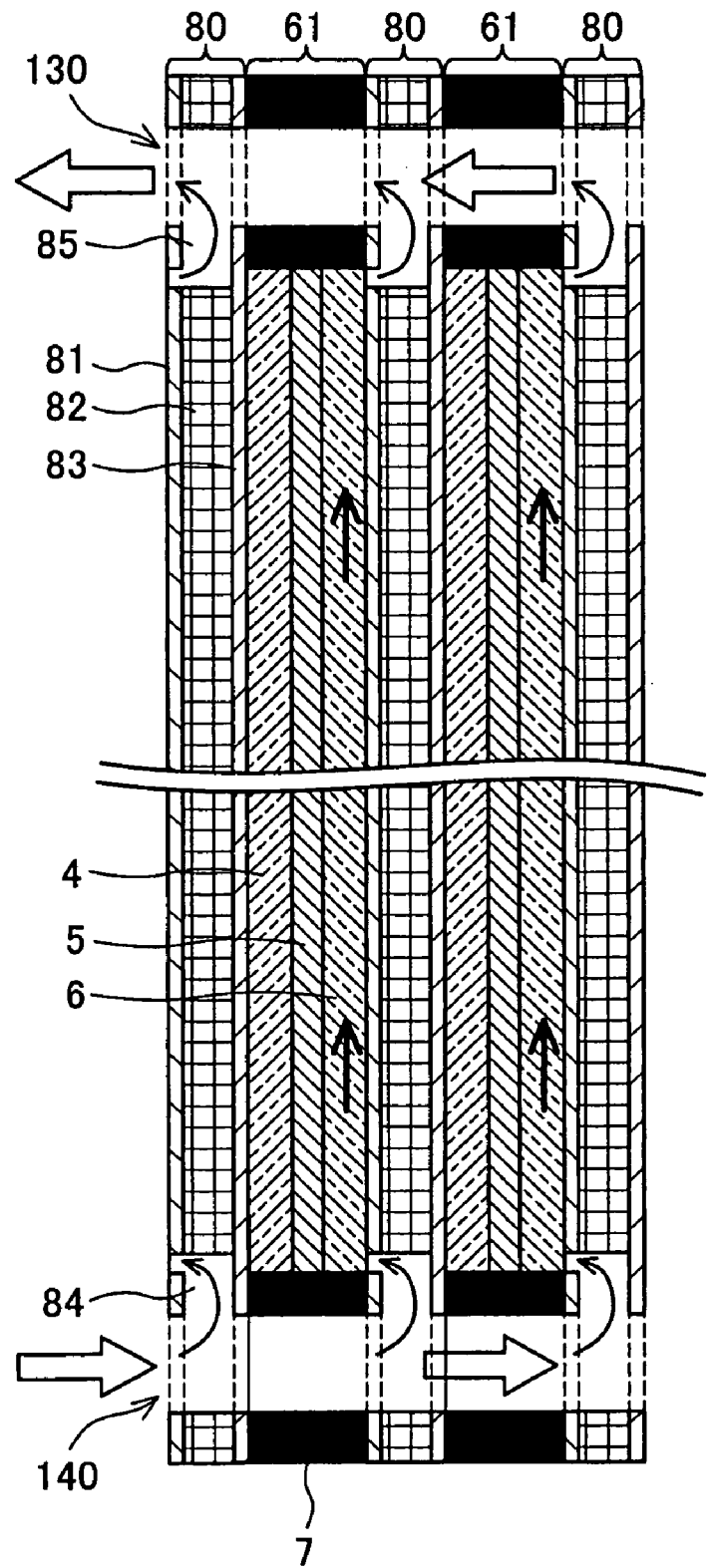
FIG. 2 is an illustration depicting stacked power generation units.
Figure 3:
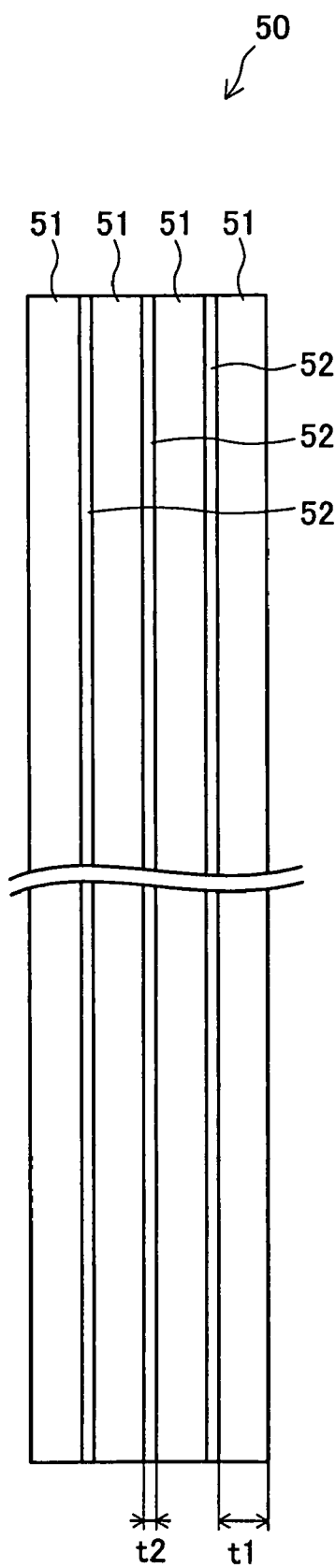
FIG. 3 is an illustration depicting a design of a shear elastic member 50.

The general design of a fuel cell according to one embodiment of the present invention will now be discussed. FIG. 1 is an illustration depicting a design of a fuel cell in an embodiment. FIG. 2 is an illustration depicting stacked power generation units. FIG. 3 is an illustration depicting a design of a shear elastic member 50.

As depicted in FIG. 1, the fuel cell 100 is provided with a stack 60 as its principal part. The stack 60 includes a power generation stack made up a plurality of stacked power generation units 61; two collector plates 62; and two insulating plates 63. Since the design of the power generation stack in the vicinity of its end parts is left-right symmetrical, the vicinity of the left end part is shown as representative at the bottom in FIG. 1. As depicted in the enlarged view, two collector plates 62 are arranged sandwiching the power generation stack, at opposite ends of the power generation stack in the stacking direction. The two insulating plates 63 are respectively disposed to the outside of the collector plates 62.

The fuel cell 100 further includes two end plates 10 constituting clamping members for clamping the stack 60 in the stacking direction; shear elastic members 50 interposed between the end plates 10 and the stack 60; and tension plates 20. In the present embodiment, because the insulating plates 63 are situated at the outermost ends of the stack 60, the shear elastic members 50 will be situated between the end plates 10 and the insulating plates 63. The tension plates 20 are arranged along the stacking direction so as to partially cover the side faces of the stack 60. The fuel cell 100 has a structure in which the stack 60 is fastened together in the stacking direction at prescribed fastening pressure P by joining the tension plates 20 to the end plates 10 with bolts 30. In order to ensure rigidity, the end plates 10 and the tension plates 20 are made of metal such as steel. The insulating plates 63 are made of resin or other insulating materials. The collector plates 62 are made of gas-impermeable, electrically conductive materials such as dense carbon or copper plate.

At top in FIG. 1 is shown an enlarged view of the section of the stack 60 that is covered by the tension plate 20. As depicted in the enlarged view, a cushion member 40 is arranged between the tension plate 20 and the stack 60. The cushion member 40 is made of material having elasticity and insulating properties, for example, rubber or resin foam. The cushion member 40 will have thickness on the order of 2 mm to 3 mm for example, and may or may not be held at prescribed force against the side face of the stack by the tension plate 20.

The design of the power generation stack will now be described making reference to FIG. 2. The power generation stack includes a multitude, e.g. several hundred, power generation units 61 which are stacked up with separators 80 (not shown in FIG. 1) between them.

As depicted in FIG. 2, each power generation unit 61 is provided with a membrane-electrode assembly (hereinafter MEA) and a sealing member 7 joined to the outside peripheral edge of the MEA. As shown in FIG. 2, the MEA is furnished with an electrolyte membrane 5 made of an ion exchange membrane; an anode electrode (not shown) disposed on one face of the electrolyte membrane 5; a cathode electrode (not shown) disposed on the other face of the electrolyte membrane 5; and diffusion layers 4, 6 disposed respectively between the separators 80 and the anode or cathode electrode. The diffusion layers, 4, 6 function as flow channels for the reactant gases (the oxidant gas and the fuel gas), and are porous bodies made using metal or carbon, for example. The sealing member 7 is adapted to provide sealing between the separators 80 and between electrodes, and is made of resin material such as silicone rubber, butyl rubber, or fluororubber for example. The sealing member 7 is fabricated by injection molding of resin material while positioning the outside peripheral edge part of the MEA to face a mold cavity. The MEA and the sealing member 7 will thereby be joined with no gap between them, so that the oxidant gas and the fuel gas will be prevented from leaking out from the joint portions.

As depicted in FIG. 2, the separator 80 is provided with a cathode plate 81 facing towards the cathode side of the power generation unit 61; a anode plate 83 facing towards the anode side of the power generation unit 61; and a middle plate 82 sandwiched between the cathode plate 81 and the anode plate 83. These three plates are juxtaposed and joined together by hot pressing. The plates 81 to 83 will be made of SUS (stainless steel) plates, for example.

Manifolds for supply and discharge of reactant gases and coolant to and from the stack 60 are provided so as to pass through the power generation stack in the stacking direction. In the separators 80 there are formed reactant gas channels adapted to distribute reactant gases supplied to the aforementioned manifolds to the anode or cathode electrode, and a coolant channel adapted to circulate coolant. Of these manifolds and channels, FIG. 2 depicts an oxidant gas supply manifold 140, an oxidant gas supply channel 84, an oxidant gas discharge channel 85, and an oxidant gas discharge manifold 130, with arrows indicating the flow path of the oxidant gas.

The description continues referring back to FIG. 1. In the fuel cell 100, supply and discharge of reactant gases and coolant to and from the power generation stack will take place from the left side in FIG. 1. For this reason, the left-side end plate 10, shear elastic member 50, insulating plate 63, and collector plate 62 will be respectively furnished with through-holes (not shown) that communicate with the manifolds provided outside and to the power generation stack.

The design of the shear elastic member 50 will now be described with reference to FIG. 3. In the present embodiment, the shear elastic member 50 includes four elastic members 51 and three rigid members 52 stacked and bonded together in alternating fashion. The elastic members 51 are made of ethylene propylene diene rubber (EPDM), while the rigid members 52 are made of SUS (stainless steel) or ceramic. Thickness t1 of the elastic members 51 is between 1.5 and 4.0 mm for example, while thickness t2 of the rigid members 52 is between 0.5 and 1.5 mm for example.

Owing to this stacked structure the shear elastic member 50 is adapted to exhibit a high degree of elastic deformation with respect to the shearing direction (a small shearing modulus), while limiting its elastic deformation with respect to the compression direction (increasing the compressive modulus). In this instance, the compression direction of the shear elastic member 50 will be a direction lying parallel to the stacking direction, while the shearing direction will be a direction lying orthogonal to the stacking direction. The shear elastic member 50 is not limited to the design described above. For example, a design having four elastic members 51 and three rigid members 52 stacked and bonded in an alternating arrangement, and additionally provided at both ends with metal members, would also be acceptable.

Figure 4:
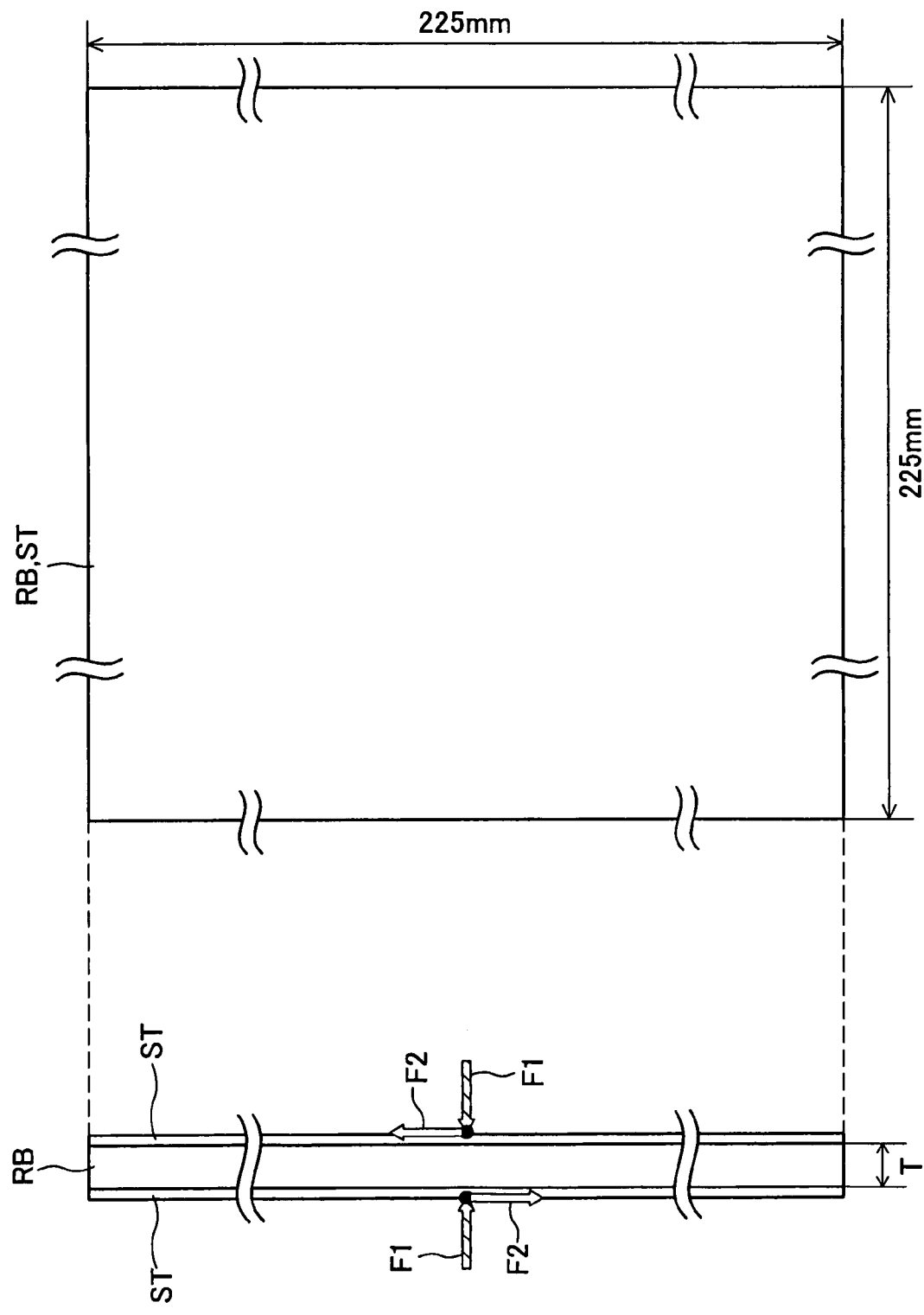
FIG. 4 is a diagram showing a sample used in a simulation.
Figure 5:
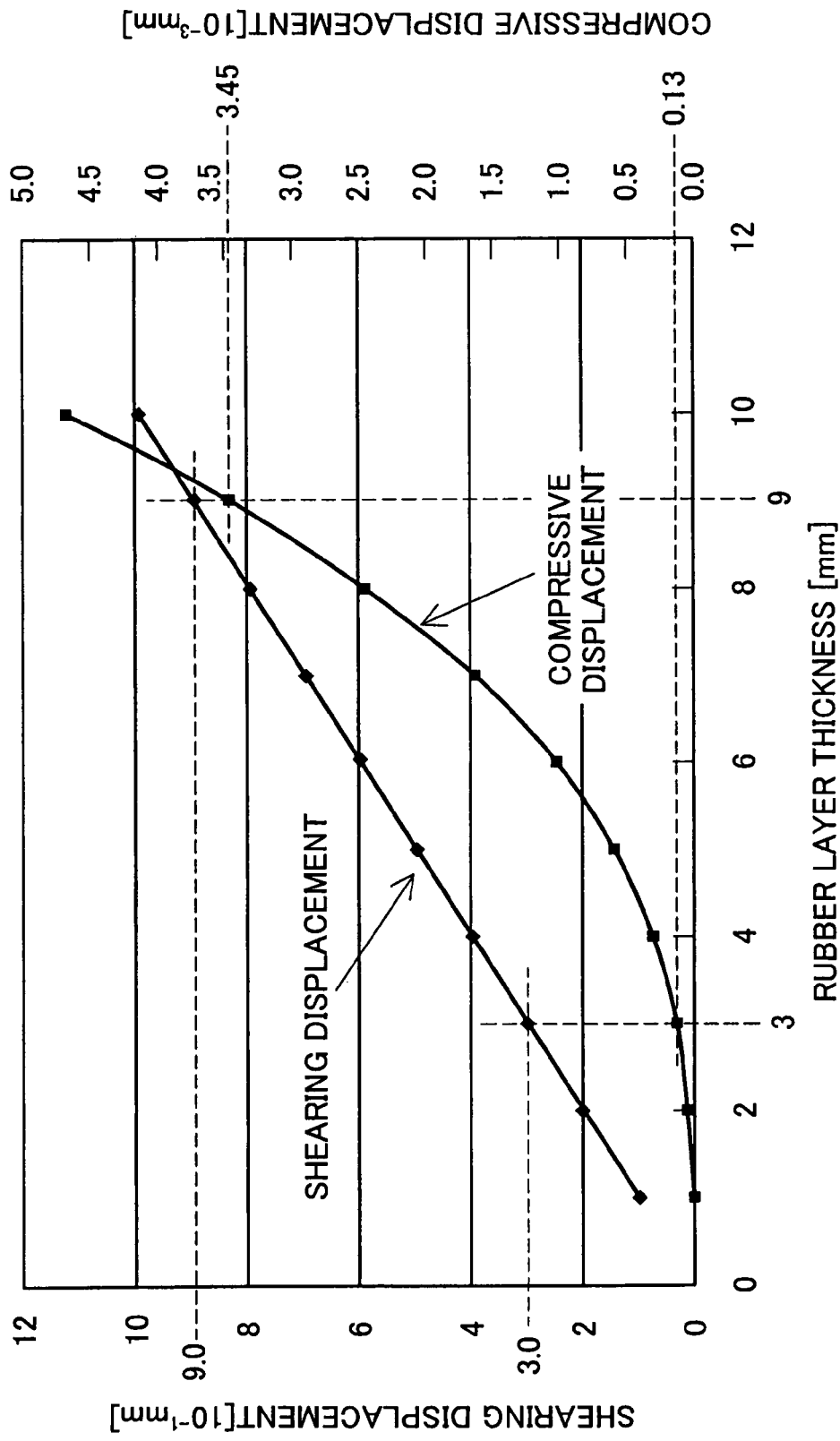
FIG. 5 is a graph depicting results of a simulation.

The reason that this stacked structure affords high elastic displacement in the shearing direction while limiting the elastic displacement in the compression direction will be discussed making reference to FIGS. 4 to 6. FIG. 4 is a diagram showing a sample used in a simulation. FIG. 5 is a graph depicting results of the simulation. FIGS. 6A and 6B show a stacked structure and EPDM of single-layer structure.

The simulation was carried out for samples composed of a square (length 225 mm per side) EPDM sheet RB sandwiched by SUS sheets ST (FIG. 4). In the simulation, compressive displacement and shearing displacement were measured for multiple samples of differing thickness T. Compressive displacement is the amount of displacement in the stacking direction observed when compressive force F1 is applied as shown in FIG. 4, while shearing displacement is the amount of displacement in the shearing direction observed when shearing force F2 is applied. In this test, compressive force F1 and shearing force F2 were each 5000 N (Newtons).

The results are given in the graph of FIG. 5. Shearing displacement increases proportionally with thickness T of the EPDM sheet RB. On the other hand, compressive displacement increases in a manner approximating a second-order curve with respect to increasing thickness T. Specifically, where thickness T of the EPDM sheet RB lies within a range of 4.0 mm or less, compressive displacement increases gradually with respect to increasing thickness T, but starts to increase sharply with respect to increasing thickness T from around the point that thickness T exceeds 4.0 mm. Consequently, the ratio of shearing displacement to compressive displacement will increase with decreasing thickness T of the EPDM sheet RB.

Specifically, as depicted in FIG. 5, when the EPDM sheet RB has thickness T of 9 mm, the ratio of the shearing displacement of 0.9 mm to the compressive displacement of about $3.45 \times 10^{-3}$ mm is about 260, whereas when the EPDM sheet RB has thickness T of 3 mm, the ratio of the shearing displacement of 0.3 mm to the compressive displacement of $0.13 \times 10^{-3}$ mm is about 2300. Assume that a stacked layer component composed of three 3 mm-thick EPDM sheets RB sandwiching thin stainless steel sheets ST (FIG. 6A) is compared with a single 9 mm-thick EPDM sheet RB (FIG. 6B), then the compressive displacement will be considerably lower for the stacked layer component while the shear displacement will be comparable.

According to the fuel cell 100 of the present embodiment described above, shear elastic members 50 are arranged between the end plates 10 and the stack 60, whereby shock or vibration to which the fuel cell 100 has been subjected will be largely alleviated before being transmitted to the stack 60, due to the vibration isolation effect of the shear elastic members 50. The shock resistance and vibration resistance of the fuel cell 100 will be improved as a result.

Furthermore, because the fuel cell 100 is provided with the shear elastic members 50, when the fuel cell 100 has been subjected to shock or vibration, increased reactive force will be imparted to the stack 60 by the cushion members 40 so that shock or vibration to which the fuel cell 100 has been subjected will be better alleviated before being transmitted to the stack 60. The shock resistance and vibration resistance of the fuel cell 100 will be further improved as a result.

Figure 7:
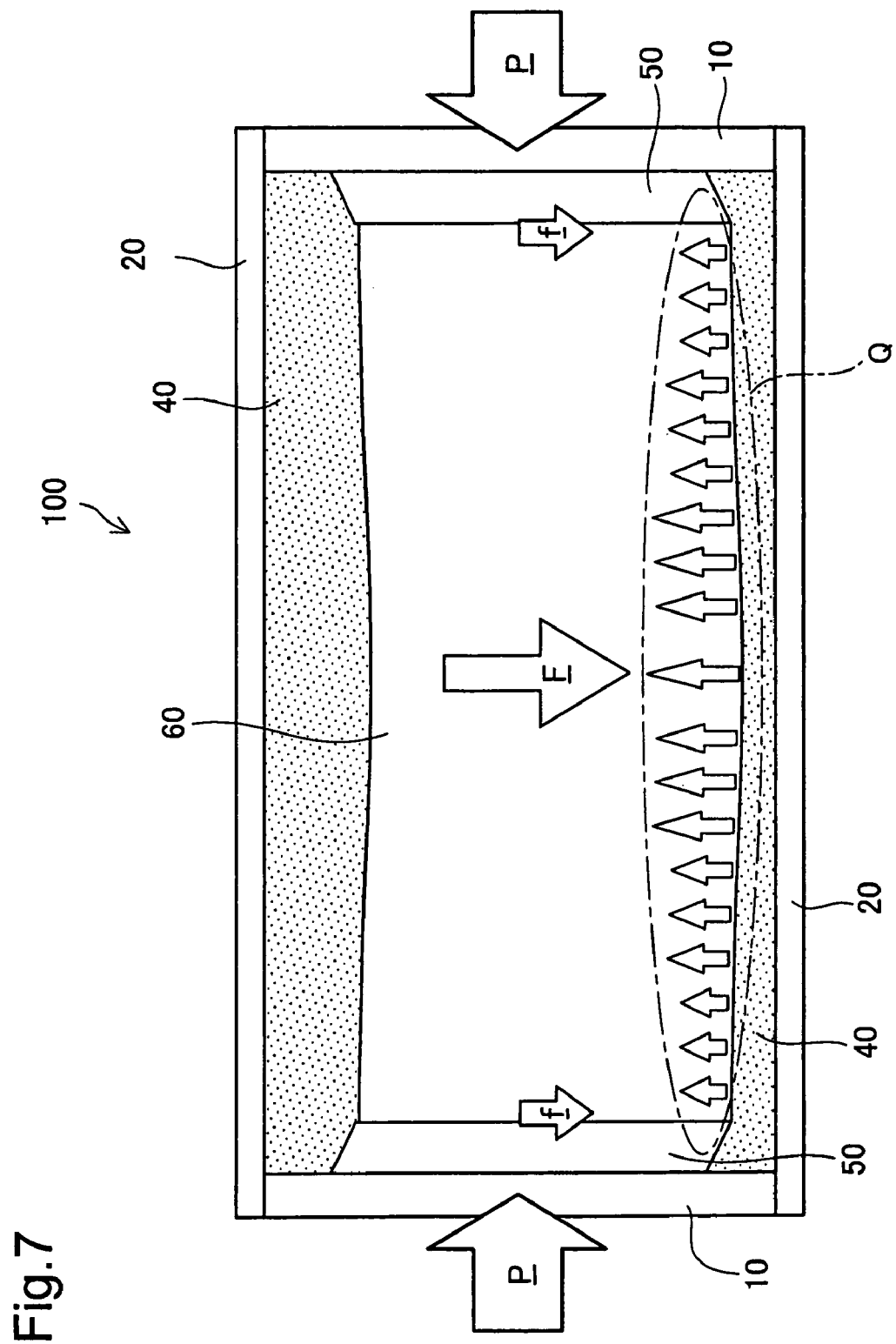
FIG. 7 is an illustration of behavior of the fuel cell in the embodiment when pressure is applied from the side faces.
Figure 8:
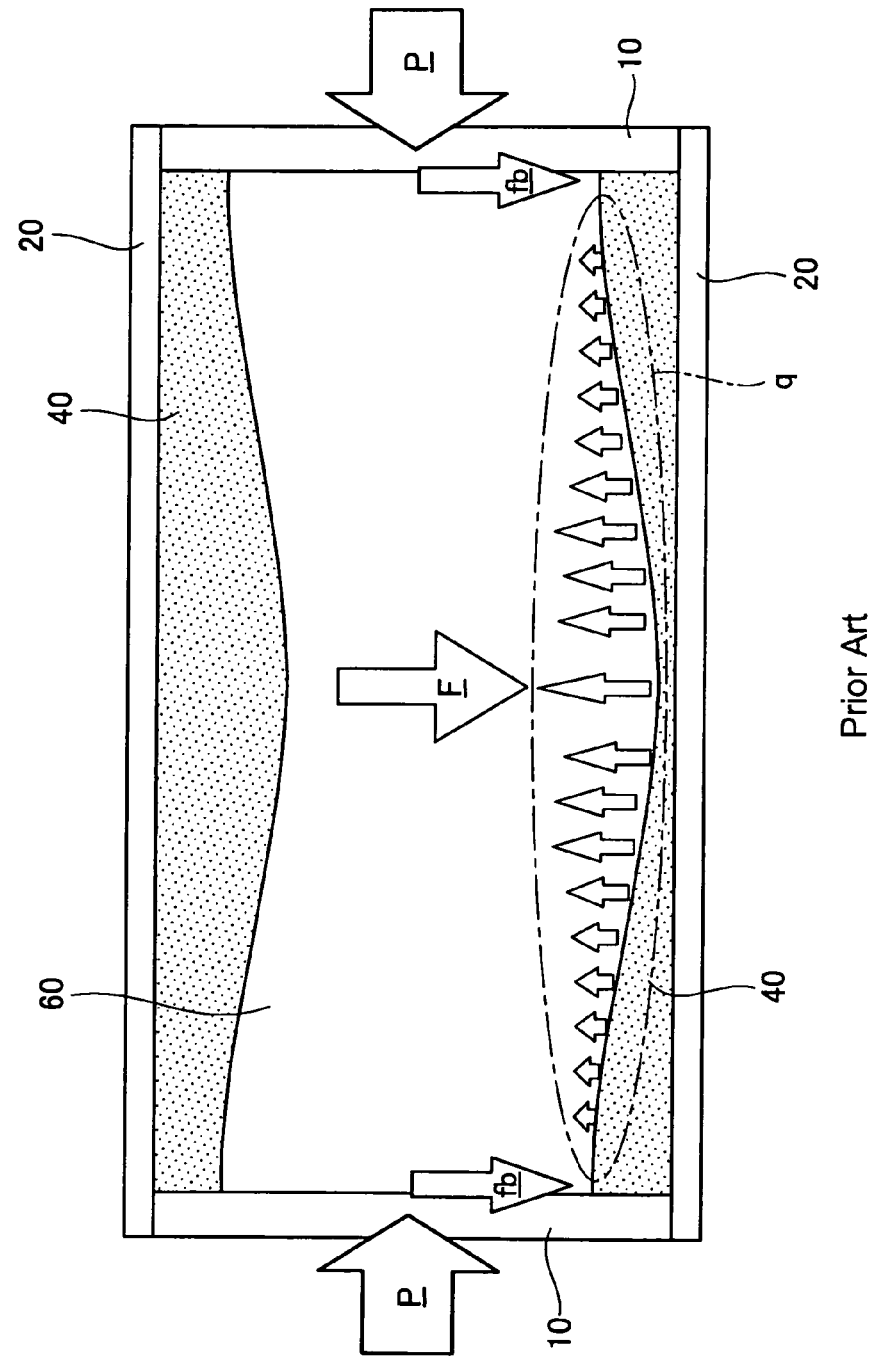
FIG. 8 is an illustration of behavior of the fuel cell of the embodiment when pressure is applied from the side faces.

The following more detailed description makes reference to FIGS. 7 and 8. FIG. 7 is an illustration of behavior of the fuel cell in the embodiment when a pressing force is applied from the side faces. FIG. 8 is an illustration of behavior of the fuel cell of the embodiment when a pressing force is applied from the side faces. In FIGS. 7 and 8, dimensional ratios of components are shown with appropriate modification for ease of understanding. For example, in FIGS. 7 and 8, the vertical dimensions of the cushion members 40 and the tension plates 20 are depicted in enlarged form. The amount of deformation of the stack 60 in the vertical direction is shown exaggerated as well.

Let it be assumed that, due to shock or vibration of the fuel cell 100, the stack 60 has been loaded with external force F directed from top to bottom in FIGS. 7 and 8. In this case, with the fuel cell 100 of the present embodiment (FIG. 7), due to shearing deformation of the shear elastic member 50, which is adapted to elastically deform in the shearing direction more easily than does the stack 60 (i.e. it has a smaller shearing modulus than the stack 60), the entire stack 60 will experience displacement in the downward direction in FIG. 7. At this point the entire stack 60 will compress downward the cushion member 40 on the lower side in FIG. 7 so that a high level of reaction force Q is imparted to the stack 60 by the cushion member 40. As a result, the stack 60 will experience a maximum shearing stress f of (F−Q)/2.

On the other hand, a conventional fuel cell 100b (FIG. 8) is not furnished with shear elastic members 50. As a result, when the conventional fuel cell 100b is loaded with the external force F, because the stack 10 has been affixed to the end plates 10 the stack 60 will not be able to experience downward displacement to the same extent as the fuel cell 100. Consequently, reaction force q imparted to the stack 60 by the cushion member 40 on the lower side in FIG. 8 will be lower than the reaction force Q in the fuel cell 100 of the embodiment (q<Q). It may be appreciated that, as a result, the maximum shearing stress fb =(F−q)/2 to which the stack 60 is subjected in the conventional example will be greater than the aforementioned maximum shearing stress f=(F−Q)/2 in the embodiment. That is, it will be appreciated that, in the embodiment, the shear elastic members 50 has the effect of reducing shearing stress to which the stack 60 is subjected. The shock resistance and vibration resistance of the fuel cell 100 will be further improved as a result.

Additionally, because the shear elastic members 50 in the present embodiment have a stacked structure like that depicted in FIG. 3, elastic deformation with respect to the shearing direction will be increased (shearing modulus reduced) while at the same time limiting elastic deformation with respect to the compression direction (increasing compressive modulus). Consequently, the shear elastic members 50 will not readily deform in the stacking direction, thus limiting displacement of the stack 60 in the stacking direction. As a result, the side faces of the stack 60 and the cushion members 40 will be prevented from being in friction due to shifting in the stacking direction, and shock resistance and vibration resistance in the stacking direction will be assured. It is undesirable for the side faces of the stack 60 and the cushion members 40 to be in friction, due to the risk of causing a defective seal between the power generation units 61 in the stack 60.

Figure 9:
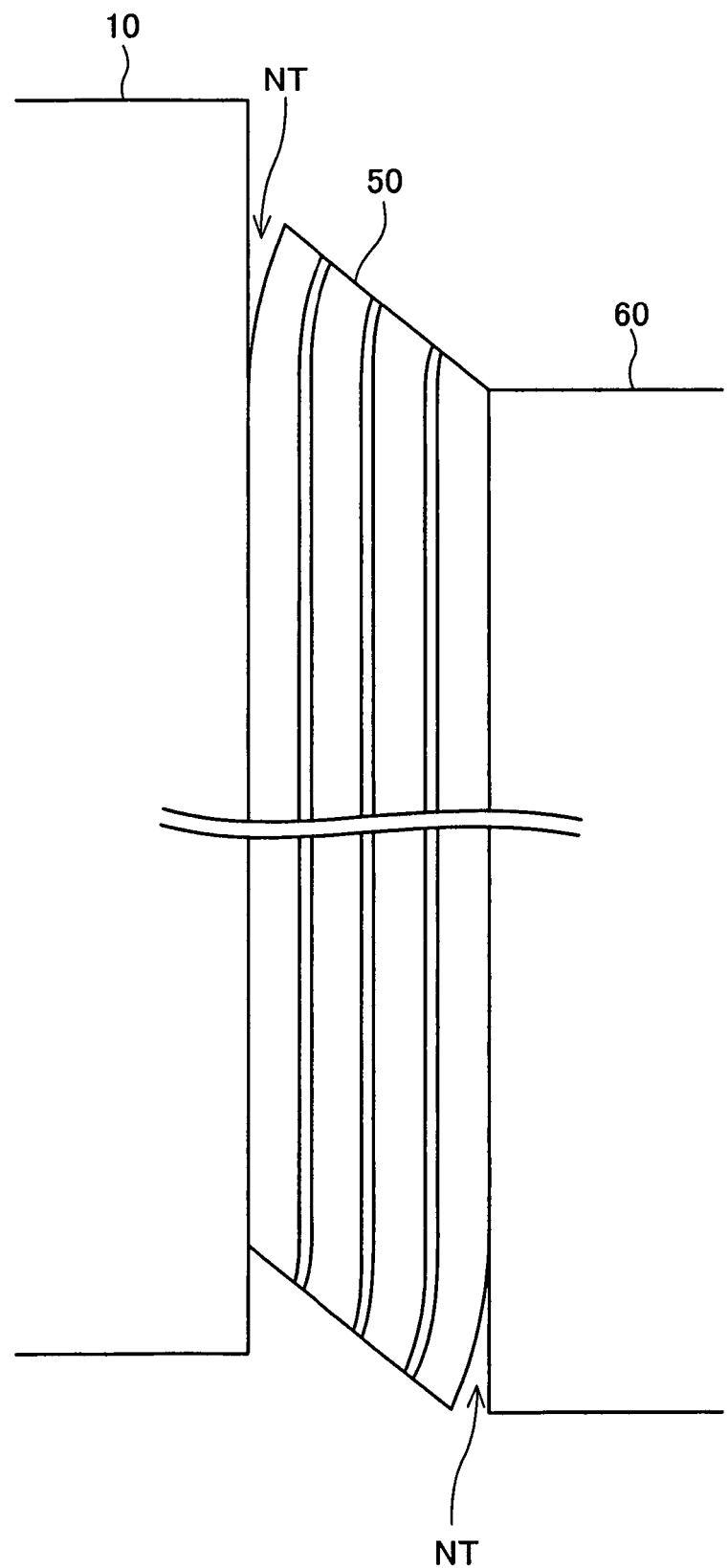
FIG. 9 is an illustration illustrating a mode of reactant gas/coolant leakage.

In preferred practice, the elastic member 51 that is situated at the outside end of the shear elastic member 50 will be bonded with sufficient strength to the end plate 10; and the elastic member 51 that is situated at the inside end of the shear elastic member 50 will be bonded with sufficient strength to the end of the stack 60, i.e. to the insulating plate 63. Particularly on the side where some or all of the reactant gases and coolant are supplied (in the example of FIG. 1, the left side), it will be preferable to carry out bonding with sufficient strength in the shear elastic member 50. FIG. 9 is an illustration illustrating a mode of reactant gas/coolant leakage. If the bonding is not sufficient, a gap NT may form between the shear elastic member 50 and the end plate 10 or between the shear elastic member 50 and the stack 60 as depicted in FIG. 9, posing a risk that reactant gas or coolant will leak out. Specifically, in preferred practice, at the bonding face between the shear elastic member 50 and the end plate or between the shear elastic member 50 and the stack, at least the peripheral edge part will be bonded with sufficient strength.

B. Modified Embodiments

Modified Embodiment 1

The number of stacked elastic members 51 in the shear elastic member 50 is not limited to four as taught in the preceding embodiment. In the preceding embodiment the end faces of the shear elastic member 50 are both elastic members 51, but this is not intended as limiting.

Figure 10:
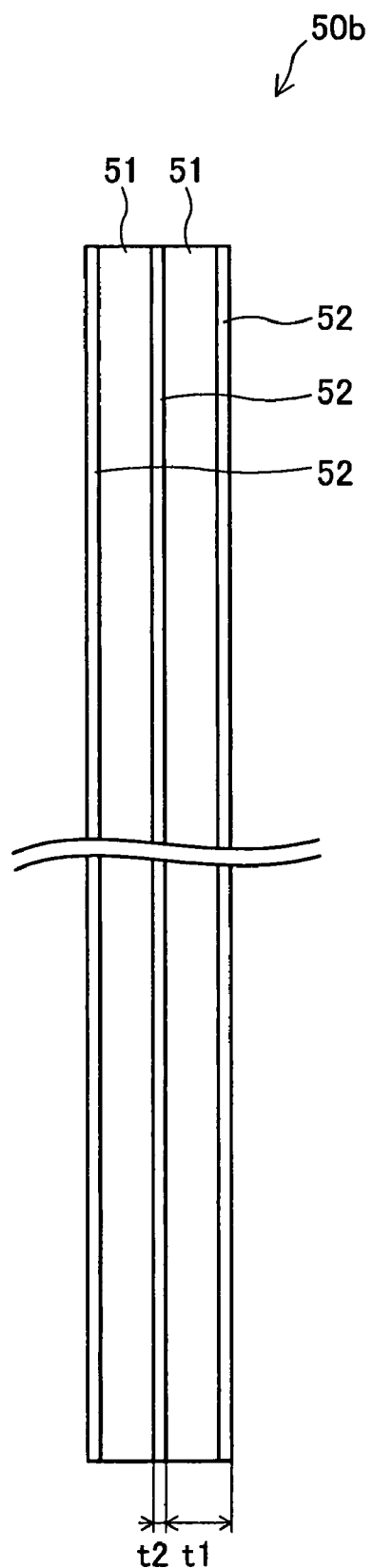
FIG. 10 is a diagram depicting a shear elastic member in a first modified embodiment.

FIG. 10 is a diagram depicting a shear elastic member in a first modified embodiment. Two elastic member 51 layers may be provided, as in the shear elastic member 50b depicted in FIG. 10. The number of layers may be modified appropriately according to the specifications of the fuel cell 100, so as to be able to limit the amount of elastic deformation in the stacking direction to a level such that gas leaks etc. will not occur, while at the same time ensuring sufficient elastic deformation in the shearing direction to provide the required shock resistance/vibration resistance. For example, in instances where high shock resistance/vibration resistance will be required, such as where the fuel cell 100 is to be installed in a car, in order to ensure a high level of elastic deformation in the shearing direction the number of elastic member 51 layers could be five or more. Alternatively, in instances where high shock resistance/vibration resistance are not crucial, such as where the fuel cell 100 will be located at a residence, a single elastic member 51 layer (with no rigid members 52) may suffice.

Rigid members 52 may constitute both end faces of the shear elastic member, as in the shear elastic member 50b depicted in FIG. 10. In this instance, it will be preferable for the rigid member 52 situated at the outside end of the shear elastic member 50b to be bonded with sufficient strength to the end plate 10; and for the rigid member 52 situated at the inside end of the shear elastic member 50b to be bonded with sufficient strength to the end of the stack 60, i.e. to the insulating plate 63.

Where rigid members 52 constitute the end faces of the shear elastic member as in the shear elastic member depicted in FIG. 10, where the rigid members 52 are sufficiently rigid and there is no risk of a gap NT forming as depicted in FIG. 9, it would be acceptable to dispense with bonding between the rigid members 52 at the end and the member disposed contacting the rigid members 52 in the stacking direction (e.g. the end plate 10 or the insulating plate 63). This will not only obviate the need for a bonding step, but will also reduce the number of assembly steps for the fuel cell 100 to afford greater ease of assembly. On the other hand, where elastic members 51 constitute both ends of the shear elastic member 50 as in the preceding embodiment, a bonding step will be required, but the number of parts will be reduced, since there will be fewer rigid members 52.

Modified Embodiment 2

In the shear elastic members 50 of the preceding embodiment, the plurality of elastic members 51 are made of EPDM, but this is not intended as limiting. The elastic members 51 are preferably made of any of various materials having rubber elasticity, such as a rubber or elastomer for example. Specific examples include silicone rubber, butyl rubber, acrylic rubber, natural rubber, fluororubber, ethylene-propylene rubber, styrene-based elastomers, fluorine-based elastomers. Rubber elasticity refers to elasticity arising through stretching and contraction of polymer chains (micro-Brownian motion). Depending on the shock resistance/vibration resistance required of the fuel cell 100, the members may be formed of a material that lacks rubber elasticity, or that undergoes elastic deformation in the shearing direction only to a certain extent. In this case as well, the elastic members 51 will preferably be made of a material whose elastic deformation in the shearing direction is greater than elastic deformation of the stack 60 in the shearing direction.

Modified Embodiment 3

In the shear elastic members 50 of the preceding embodiment the plurality of elastic members 51 are stacked sandwiched by rigid members 52; however, the plurality of elastic members 51 may be stacked sandwiched by other members, other than the rigid members 52, which experience smaller compressive deformation in the stacking direction than the elastic members 51. For example, instead of rigid members 52, members made of materials which lack the rigidity of metal or ceramic, but which also lack rubber elasticity, for example, fabric knit from high strength fibers, or plastic could be used.

Modified Embodiment 4

Various structures and materials can be employed for the cushion members 40 in the preceding embodiment. For example, the cushion members 40 may have a double-layer structure composed of an insulating layer adapted to contact and insulate the stack 60, and a cushioning layer positioned between the insulating layer and the tension plate 20, and adapted to give rise to reaction force. For example, the insulating layer may employ a fluororesin, while the cushioning layer may employ urethane foam, fluororubbers, fluorine-based elastomers or the like. Members of bag form filled with air can also be used for the cushion members 40.

Modified Embodiment 5

Figure 11:
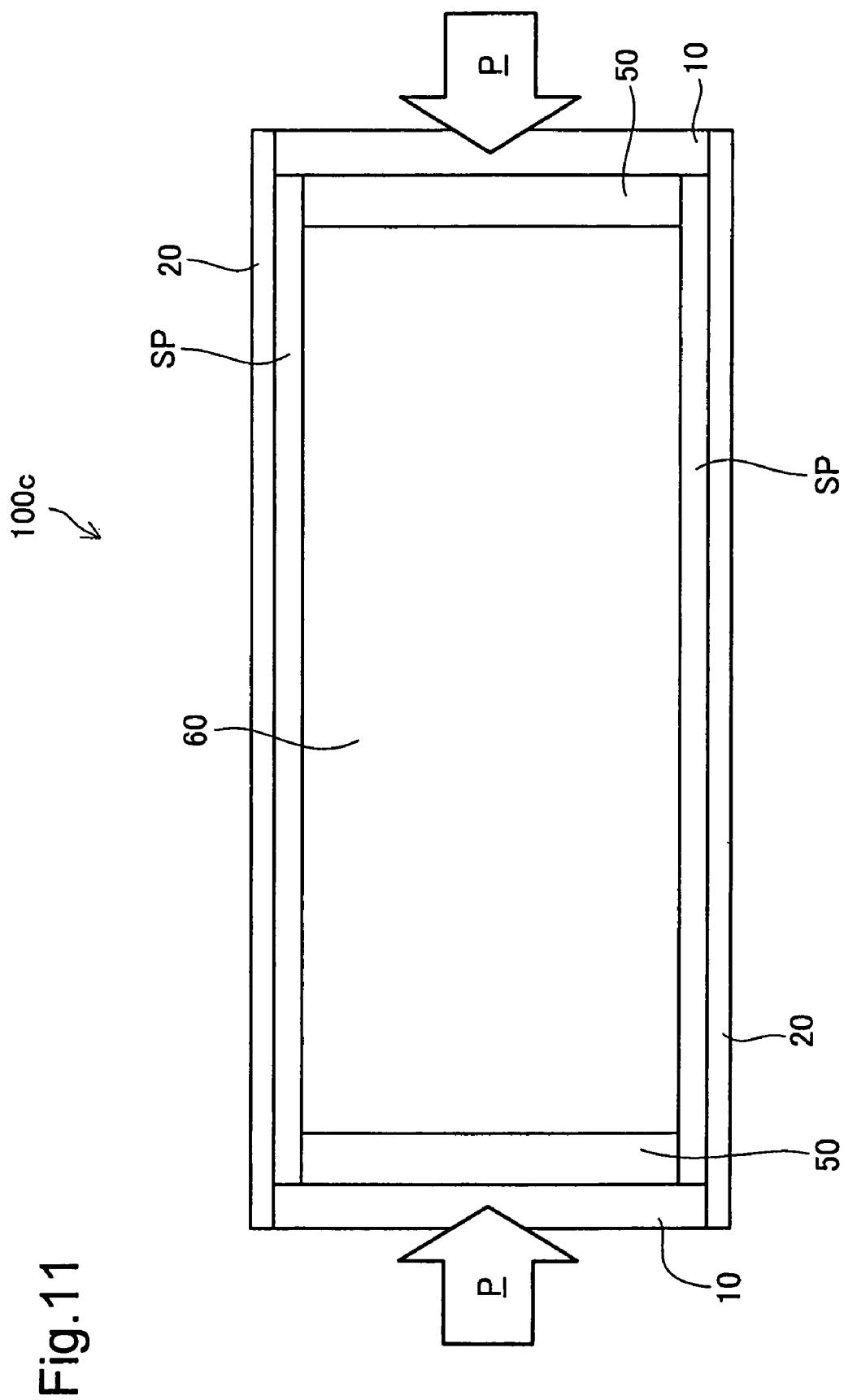
FIG. 11 is a schematic diagram depicting a fuel cell in a fifth modified embodiment.
Figure 12:
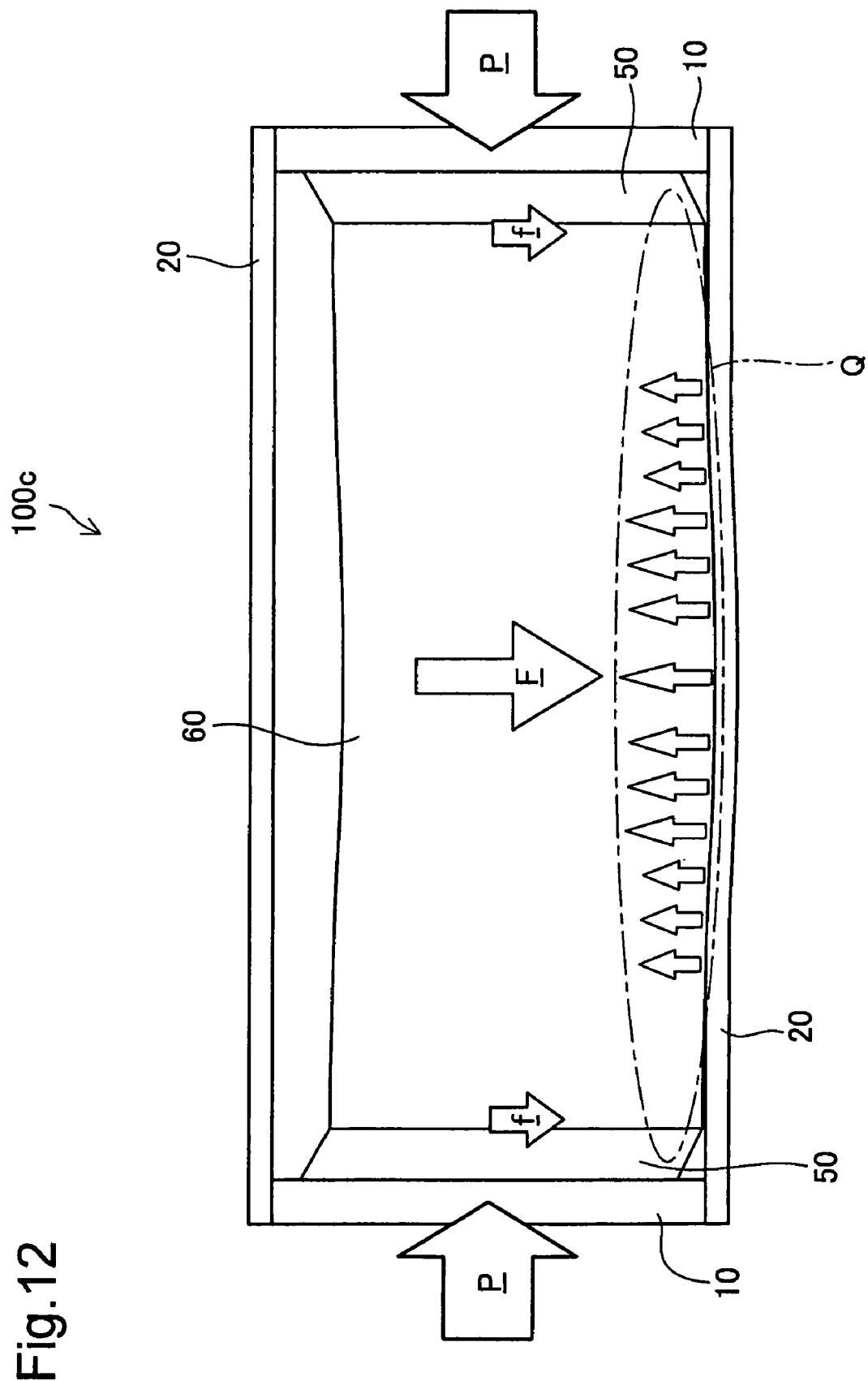
FIG. 12 is an illustration of behavior of the fuel cell of the fifth modified embodiment when pressure is applied from the side faces.

The cushion members 40 in the preceding embodiment may be dispensed with altogether. In this case, shorting among the plurality of power generation units 61 that make up the stack 60 may be prevented by a design that uses an insulating material instead of metal, or an applied insulating layer. A fifth modified embodiment of a fuel cell without the cushion members 40 will be described with reference to FIGS. 11 and 12. FIG. 11 is a schematic diagram depicting a fuel cell in the fifth modified embodiment. FIG. 12 is an illustration of behavior of the fuel cell of the fifth modified embodiment when pressure is applied from the side faces. As in FIGS. 7 and 8 described previously, in FIGS. 11 and 12, dimensional ratios of components are shown with appropriate modification for ease of understanding.

The fuel cell 100c of Modified Embodiment 5 differs from the fuel cell 100 of the Embodiment in that it lacks cushion members 40. In the fuel cell 100c of Modified Embodiment 5, due to the absence of cushion members 40 the tension plates 20 will be situated closer to the side faces of the stack, and gaps SP will be present between the tension plates 20 and the side faces of the stack 60. Other arrangements in the fuel cell 100c of Modified Embodiment 5 are the same as in the fuel cell 100 of the Embodiment and will not be described here.

Let it be assumed that, due to shock or vibration of the fuel cell 100c, the stack 60 has been loaded with external force F directed from top to bottom in FIG. 12. In this case, as with the fuel cell 100 of the Embodiment, in the fuel cell 100c of the present modified embodiment the entire stack 60 will experience displacement in the downward direction in FIG. 12 due to shearing deformation of the shear elastic member 50. At this point the entire stack 60 will flex and come into contact with the tension plate 20 on the lower side. As a result, reaction force Q' will be imparted to the stack 60 by the flexed tension plate 20. As a result, in the present embodiment, the maximum shearing stress f applied to the stack 60 will be reduced by the reaction force Q'; $f=(F-Q')/2$. The shock resistance and vibration resistance of the fuel cell 100 will be improved as a result.

Modified Embodiment 6

In the preceding embodiment, the shear elastic members 50 are respectively disposed at the ends of the stack 60, but it would be acceptable to dispose a shear elastic member 50 at one end only. For example, where high shock resistance/vibration resistance is not a requirement, it would be conceivable to provide a shear elastic member 50 at one end only.

Other Modified Embodiments

The insulating plates 63 in the Embodiment may be dispensed with in instances where the shear elastic member 50 has sufficient insulating properties. In such cases, the shear elastic member 50 would be disposed in contact with and bonded to the collector plate 62.

In the preceding embodiments, the separators 80 are composed of three layers of metal plate layers, but the separators 80 may be designed with different designs and materials. Also, various other shapes for the separators 80 would be possible.

The present invention has been shown in detail hereinabove with reference to certain preferred exemplary embodiments and modified embodiments. However, the invention is in no way limited to the embodiments or modified embodiments described hereinabove. Various modifications and equivalent arrangements will be included within the scope of the present invention. While the various elements of the disclosed invention have been shown in various combinations and arrangements herein, these are merely exemplary, it being possible for elements to be optionally added or subtracted. A single element may be employed as well. Such modes will fall within the scope of the invention.

The present application relates to Japanese Patent Application No. 2006-350905 filed on Dec. 27, 2006 and claims priority on the basis of said Japanese Patent Application, the entire disclosure of which is incorporated herein by reference.

The invention claimed is:

1. A fuel cell employing power generation units that have an electrolyte membrane and electrodes respectively disposed to either side of the electrolyte membrane, the fuel cell comprising:
   a stack that includes a stacked plurality of the power generation units;
   a clamping member that clamps the stack in the stacking direction; and
   a shear elastic member interposed between the clamping member and an end face of the stack in the stacking direction, and configured to elastically deform in a shearing direction which lies orthogonal to the stacking direction, thereby causing the stack to displace in the shearing direction, wherein
   an amount of elastic deformation of the shear elastic member in the shearing direction is greater than an amount of elastic deformation of the stack in the shearing direction,
   one of a cushion member and a space is provided between a tension plate and an assembly of the stack and the shear elastic member, and
   the one of the cushion member and the space extends along an entire length of the stack and abuts the shear elastic member.

2. The fuel cell in accordance with claim 1, wherein the shear elastic member includes a rubber elastic member having rubber elasticity.

3. The fuel cell in accordance with claim 1, wherein the shear elastic member has a contact face that contacts another member in the stacking direction; and
   at least a peripheral edge part of the contact face is bonded to the another member.

4. A fuel cell employing power generation units that have an electrolyte membrane and electrodes respectively disposed to either side of the electrolyte membrane, the fuel cell comprising:
   a stack that includes a stacked plurality of the power generation units;
   a clamping member that clamps the stack in the stacking direction; and
   a shear elastic member interposed between the clamping member and an end face of the stack in the stacking direction, and configured to elastically deform in a shearing direction which lies orthogonal to the stacking direction, thereby causing the stack to displace in the shearing direction, wherein
   the shear elastic member includes a plurality of rubber elastic members having rubber elasticity, and one or a plurality of low-deforming members whose compressive deformation in the stacking direction is less than that of the plurality of rubber elastic members,
   the plurality of rubber elastic members are stacked with interposition of the low-deformation members, one of a cushion member and a space is provided between a tension plate and an assembly of the stack and the shear elastic member, and the one of the cushion member and the space extends along an entire length of the stack and abuts the shear elastic member.

5. The fuel cell in accordance with claim 4, wherein
at least one end of the shear elastic member in the stacking direction is constituted by the low-deforming member, which is disposed in contact against the clamping member or the stack.

6. The fuel cell in accordance with claim 4, wherein
at least one end of the elastic member in the stacking direction is constituted by a rubber elastic member, which is disposed in contact against the clamping member or the stack.

7. The fuel cell in accordance with claim 1, wherein
when provided with the cushion member, the cushion member imparts a reaction force to at least a portion of a side face of the stack which extends along the stacking direction, responsive to displacement of the stack in the shearing direction.

8. The fuel cell in accordance with claim 7, wherein
the tension plate is disposed covering said at least a portion of the side face of the stack that extends along the stacking direction, and the cushion member is positioned between the stack and the tension plate and has cushioning properties.

9. The fuel cell in accordance with claim 1, wherein
the stack further includes a collector plate arranged between the clamping member and the plurality of the power generation units.

10. The fuel cell in accordance with claim 9, wherein
the stack further includes an insulating plate arranged between the collector plate and the clamping member.

* * * * *